Figure 1:
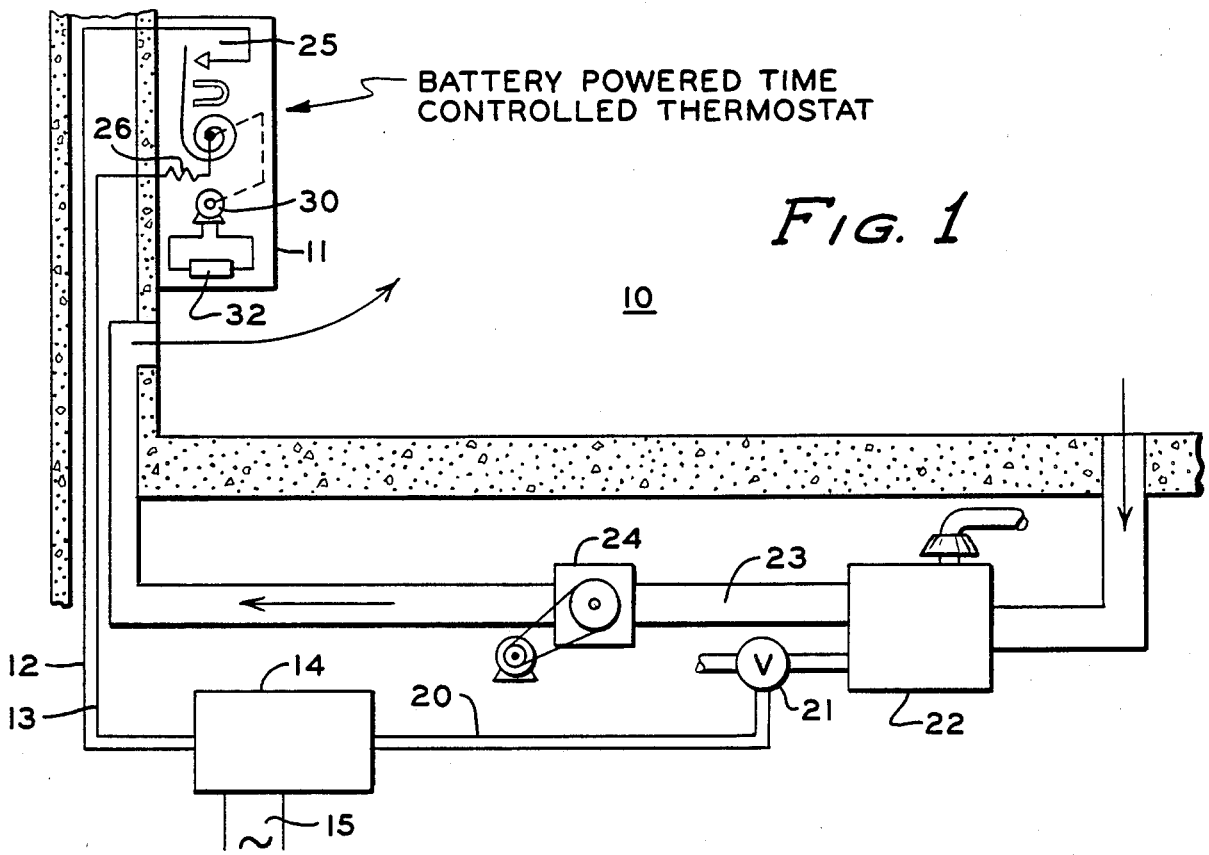

United States Patent [19]

Kompelien

[11] Patent Number: 4,635,845
[45] Date of Patent: Jan. 13, 1987

[54] TIME CONTROLLED THERMOSTAT

[75] Inventor: Arlon D. Kompelien, Richfield, Minn.

[73] Assignee: Honeywell Inc., Minneapolis, Minn.

[21] Appl. No.: 108,997

[22] Filed: Jan. 2, 1980

Related U.S. Application Data

[60] Continuation of Ser. No. 944,098, Sep. 20, 1978, abandoned, which is a division of Ser. No. 639,523, Dec. 10, 1975, abandoned.

[51] Int. Cl.⁴ ............................. F23N 5/20; H02J 7/00
[52] U.S. Cl. ...................................... 236/46 R; 307/66
[58] Field of Search ................. 307/66; 236/46 R, 47; 337/302, 303; 318/441

[56] References Cited

U.S. PATENT DOCUMENTS 3,214,670 10/1965 Schaf ................................. 52/23 X
3,739,226 6/1973 Seiter et al. ....................... 307/66 X
3,948,441 4/1976 Perkins et al. ..................... 236/46 R Primary Examiner—William E. Wayner
Attorney, Agent, or Firm—Clyde C. Blinn

[57] ABSTRACT

A two wire rechargeable battery powered electric time controlled thermostat apparatus adapted to be connected by two wires to a source of alternating current voltage and control apparatus for controlling the supply of temperature condition medium to the space wherein the thermostat is located with a rectifying circuit means in the thermostat apparatus for recharging the battery from the source over the two wires.

3 Claims, 4 Drawing Figures

TIME CONTROLLED THERMOSTAT

This is a continuation of application Ser. No. 944,098, now abandoned, filed Sept. 20, 1978, which is a division of Ser. No. 639,523, filed Dec. 10, 1975, now abandoned.

BACKGROUND AND SUMMARY OF THE INVENTION

Time controlled or electric clock thermostats have for many years required at least three wires to connect the thermostat to a remote source of power and a control apparatus for a system for controlling the supply of temperature condition medium to the space wherein the thermostat is located. In the modification of original construction in which two wires are required for a simple thermostat, considerable difficulty is experienced when the system is to be converted for use with a clock thermostat as extra wires are pulled through the wall.

To overcome the necessity of pulling extra wires to power a clock thermostat over the same two wires on which the control apparatus is controlled, various expensive schemes have been provided such as in the Clifford L. Nelson et al U.S. Pat. No. 3,620,448, issued Nov. 16, 1971, and the Balthasar H. Pinckaers U.S. Pat. No. 3,599,863, issued Aug. 17, 1971, wherein the clock motor is powered over the two wires and a signal of a different power factor or waveform is superimposed over the two wires for controlling the remote control apparatus.

Obviously, with the advent of lower power, extremely accurate battery driven time controlled units or clocks, such as the crystal oscillator type now available, the use of such a motor for powering an electric clock thermostat has been proposed, however, because of the torque requirement that the motor must have to do the added work of directly moving a mechanism which changes the temperature maintained in the space, power required from such a battery is large enough that that frequency changing or recharging of the battery must be accomplished.

The present invention provides a rechargeable battery powered electric clock thermostat for use in a system for controlling remote control apparatus over two wires and for connecting the battery through a charging circuit over the same two wires to a remote power source; so that, an electric clock thermostat can be used to replace a simple thermostat without the expense of additional wires for providing a control circuit for the thermostat and an energization circuit for the clock motor.

Figure 2:
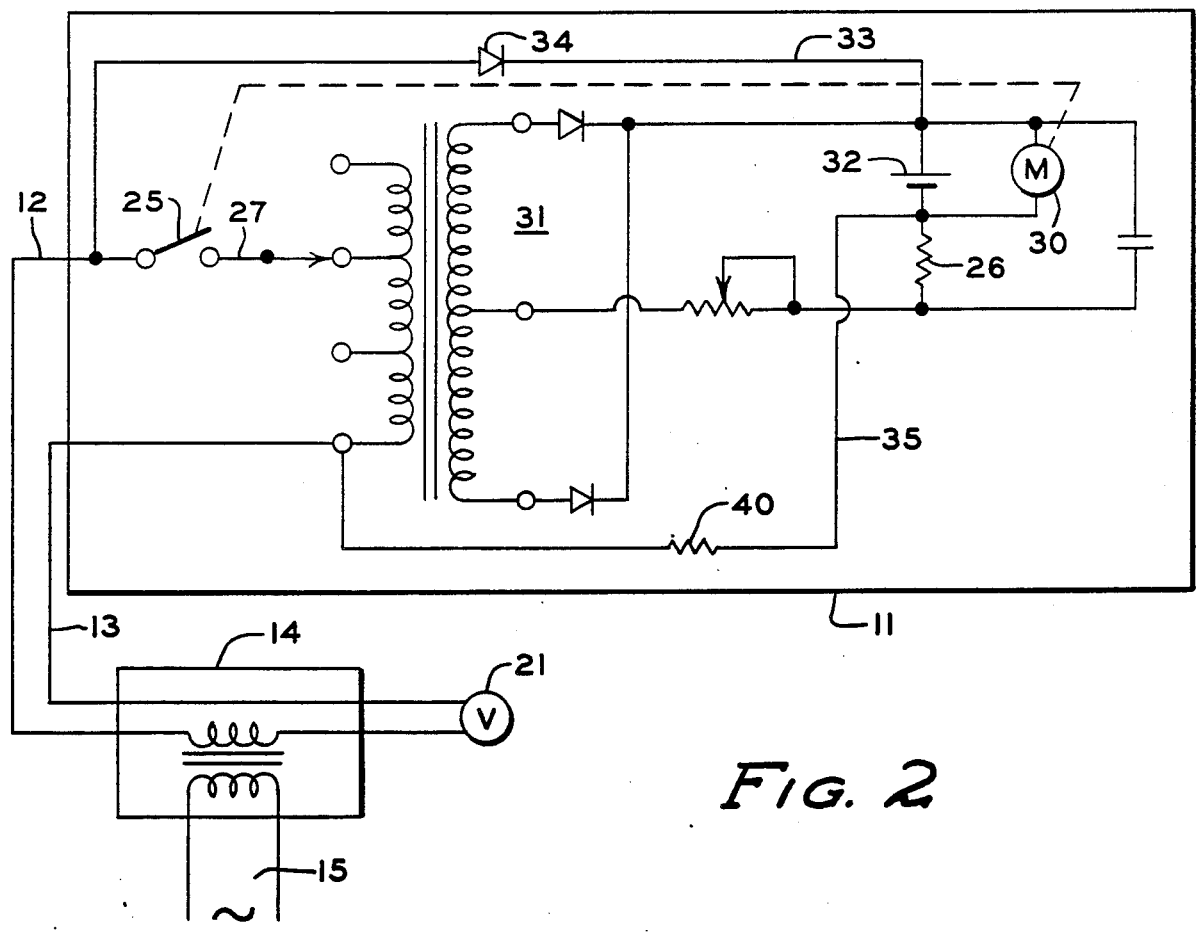
Figure 3:
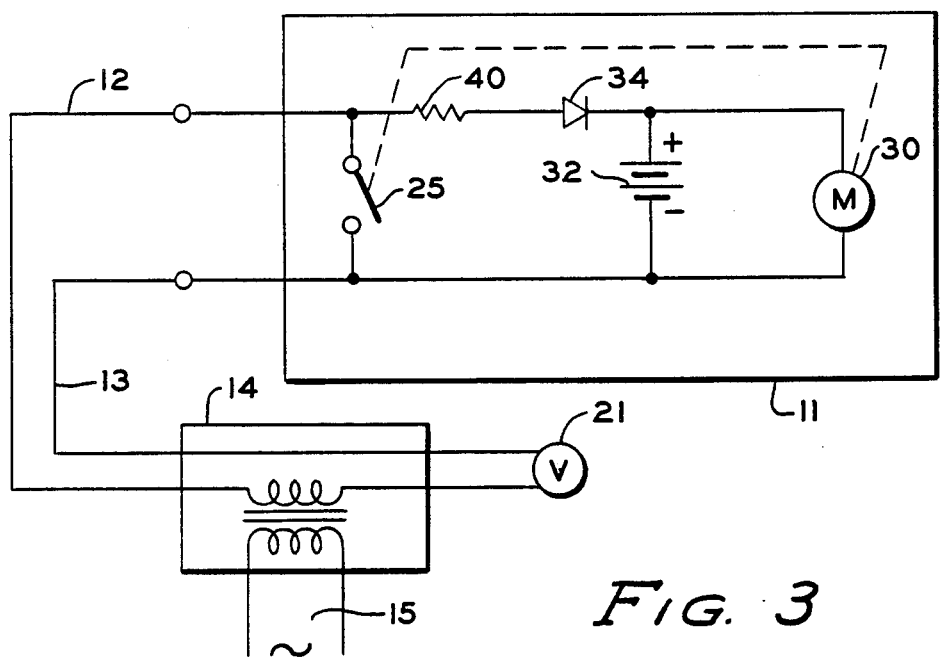
Figure 4:
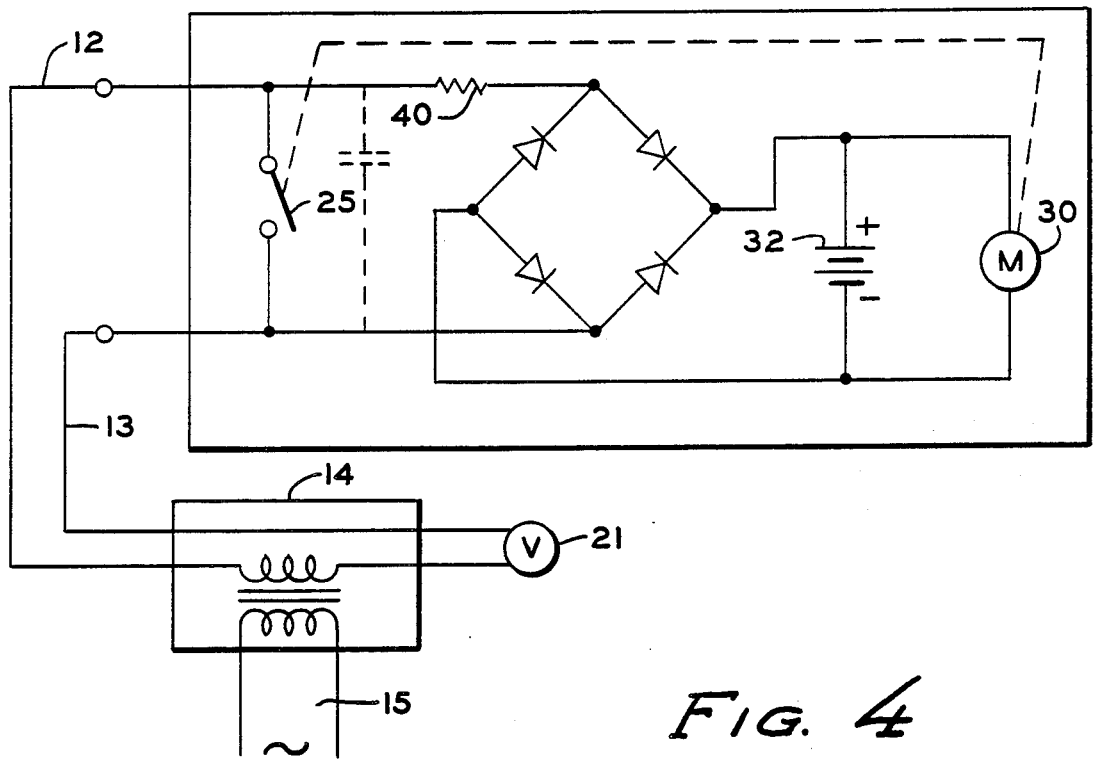

The embodiments of the present invention are shown in the following figures of which FIG. 1 is a schematic showing of the connection of a battery powered time controlled thermostat apparatus to a remote source of power and control apparatus for controlling the supply of temperature condition medium to the space in which the thermostat is mounted, and FIG. 2 is a first embodiment of the present invention, and FIG. 3 is another embodiment of the invention, and FIG. 4 is still another embodiment of the invention.

DESCRIPTION OF THE INVENTION

Referring to FIG. 1, the temperature in a space 10 is controlled by a temperature responsive device or thermostat apparatus 11 connected by two wires 12 and 13 to a remote control panel 14. Panel 14 has a source of power 15 and an output circuit 20 connected to a control apparatus or valve 21 of a system for controlling the supply of fuel or gas to a temperature conditioning apparatus or furnace 22 for temperature conditioning or heating medium or air being circulated through the space 10 through duct 23 by a fan 24.

Thermostat apparatus 11 has a temperature responsive control means or mechanism for maintaining one of two different levels of temperature or bimetal operated switch means 25, such as a clock thermostat disclosed in the Carl. G Kronmiller U.S. Pat. No. 2,558,617, issued June 26, 1951, comprising a bimetal element which controls a switch to complete a circuit to provide power to remote control appaaratus 21. The temperature control of the thermostat apparatus 11 is adjusted by a time controlled mechanism or clock driven by a motor 30 to selectively adjust the control temperature maintained during different time periods to typically maintain a daytime temperature of 72° and at 10:00 p.m. to change the control point of the thermostat to maintain a nighttime temperature of 65° until morning when the daytime temperature is again selected. Any one particular type of thermostat apparatus 11 for selectively maintaining different controlled temperatures in a space 10 is not required for use in the present invention. Motor 30 is a rechargeable battery powered motor connected to a battery 32 which is recharged over the same two wires 12 and 13 by a charging circuit to be described.

Referring to FIG. 2, thermostat 11 is shown connected to panel 14 for controlling control apparatus or valve 21. Temperature responsive switch 25 is adapted to connect the control circuit to the source of power 15 to energize valve 21. Circuit 31 is an adjustable circuit for energizing conventional anticipation heater 26 thermally connected to temperature responsive switch means 25. The voltage to heater 26, can be adjusted by selectively positioning input tap 27 to regulate the control of thermostat switch 25. Motor 30 is connected to rechargeable battery 32 for driving the time controlled mechanism of thermostat 11. One terminal of battery 32 is connected by conductor 33 to a diode 34 to wire 12 and the other terminal of the battery is connected by conductor 35 through a limiting resistor 40 to the other wire 13 for providing a charging circuit to battery 32.

The battery is charged from source 15 all the time. By means of a limiting resistor 40, the current drain from the source for the recharging of the battery is limited below that required to operate valve 21. The valve 21 will not operate when the thermostat is not calling for heat.

The embodiment of the invention shown in FIG. 3 comprises the thermostat 11 connected over wires 12 and 13 to panel 14 with the source of power 15 and valve 21. The thermostat switch 25 is connected in parallel with motor 30 so that when the switch is open current is supplied through the diode 34 to recharge battery 32. A limiting resistor 40 is connected to limit the current to prevent the operation of valve 21.

The embodiment of the invention as shown in FIG. 4 has a thermostat 11 connected over two wires 12 and 13 to a remote panel 14 having a source of power 15 and a valve 21. Rectifying means 34 for supplying power to recharge battery 32 comprises a conventional diode bridge for providing a rectifying current during both cycles of the alternating current voltage of source 15. The currrent drain from the source is limited by limiting resistor 40.

The embodiments of the invention in which an exclusive property or right is claimed are defined as follows:

1. In a timer controlled space thermostat for switching a circuit connecting remote space conditioning apparatus with a remote A.C. power source, thermostatic switching means in said circuit, electrically operated timer means for periodically changing the temperature set point of said thermostat, a rechargeable storage battery for operation of said timer means, means for charging said battery when said thermostatic switching means is closed comprising a transformer having a primary winding in said circuit and a secondary winding connected across said battery, and current rectifying means connected in series with said secondary and said battery, and means for charging said battery when said thermostatic switching means is open comprising circuit means connecting a resistor, a diode, and said battery in series across said thermostatic switching means.

2. In a timer controlled space thermostat for switching a circuit connecting remote space conditioning apparatus with a remote A.C. power source, electrically operated timer means for periodically changing the temperature set point of said thermostat, a rechargeable battery for operation of said timer means, charging means for said battery comprising a transformer having a primary winding in said circuit and a secondary winding connected across said battery, current rectifying means connected in series with said secondary winding and said windings being so connected as to be only energized when the thermostat is closed.

3. The timer controlled thermostat claimed in claim 2 having a casing enclosing a portion of said circuit, said timer means, said battery, and said transformer.

* * * * *